United States Patent
Larsson et al.

(10) Patent No.: US 8,171,468 B2
(45) Date of Patent: May 1, 2012

(54) DOWNLOADING AND UPGRADING TERMINAL SOFTWARE OVER THE AIR OF A WIRELESS DEVICE

(75) Inventors: Peter Larsson, Solna (SE); Joakim Karl Olof Bergström, Stockholm (SE); Johan Lundsjo, Spånga (SE); Svante Signell, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1113 days.

(21) Appl. No.: 10/583,956

(22) PCT Filed: Dec. 22, 2003

(86) PCT No.: PCT/SE03/02050
§ 371 (c)(1),
(2), (4) Date: Feb. 14, 2008

(87) PCT Pub. No.: WO2005/062642
PCT Pub. Date: Jul. 7, 2005

(65) Prior Publication Data
US 2008/0141239 A1    Jun. 12, 2008

(51) Int. Cl.
*G06F 9/445* (2006.01)
(52) U.S. Cl. .................. 717/173; 717/178
(58) Field of Classification Search .......... None
See application file for complete search history.

(56) References Cited

U.S. PATENT DOCUMENTS

| | | | |
|---|---|---|---|
| 5,896,566 A * | 4/1999 | Averbuch et al. | 455/419 |
| 6,052,600 A | 4/2000 | Fette et al. | |
| 6,622,017 B1 | 9/2003 | Hoffman | |
| 2003/0216927 A1 | 11/2003 | Sridhar et al. | |
| 2005/0064857 A1* | 3/2005 | Coppinger et al. | 455/418 |

OTHER PUBLICATIONS

International Search Report for PCT/SE2003/002050 dated Jul. 22, 2004.

* cited by examiner

*Primary Examiner* — Chuck Kendall
(74) *Attorney, Agent, or Firm* — Nixon & Vanderhye P.C.

(57) ABSTRACT

The technology downloads and upgrades terminal software of a communications device over-the-air in a efficient and fail-safe manner. The communication device is provided with radio software from a server via a wireless network including a number of access networks. A download is initiated of radio software designed for a first of two different radio access technologies of the communication device. One of the two radio access technologies of the communication device is selected for downloading the software. The radio software is downloaded via the selected available radio access technology. The radio software designed for the first radio access technology is stored in memory.

28 Claims, 8 Drawing Sheets

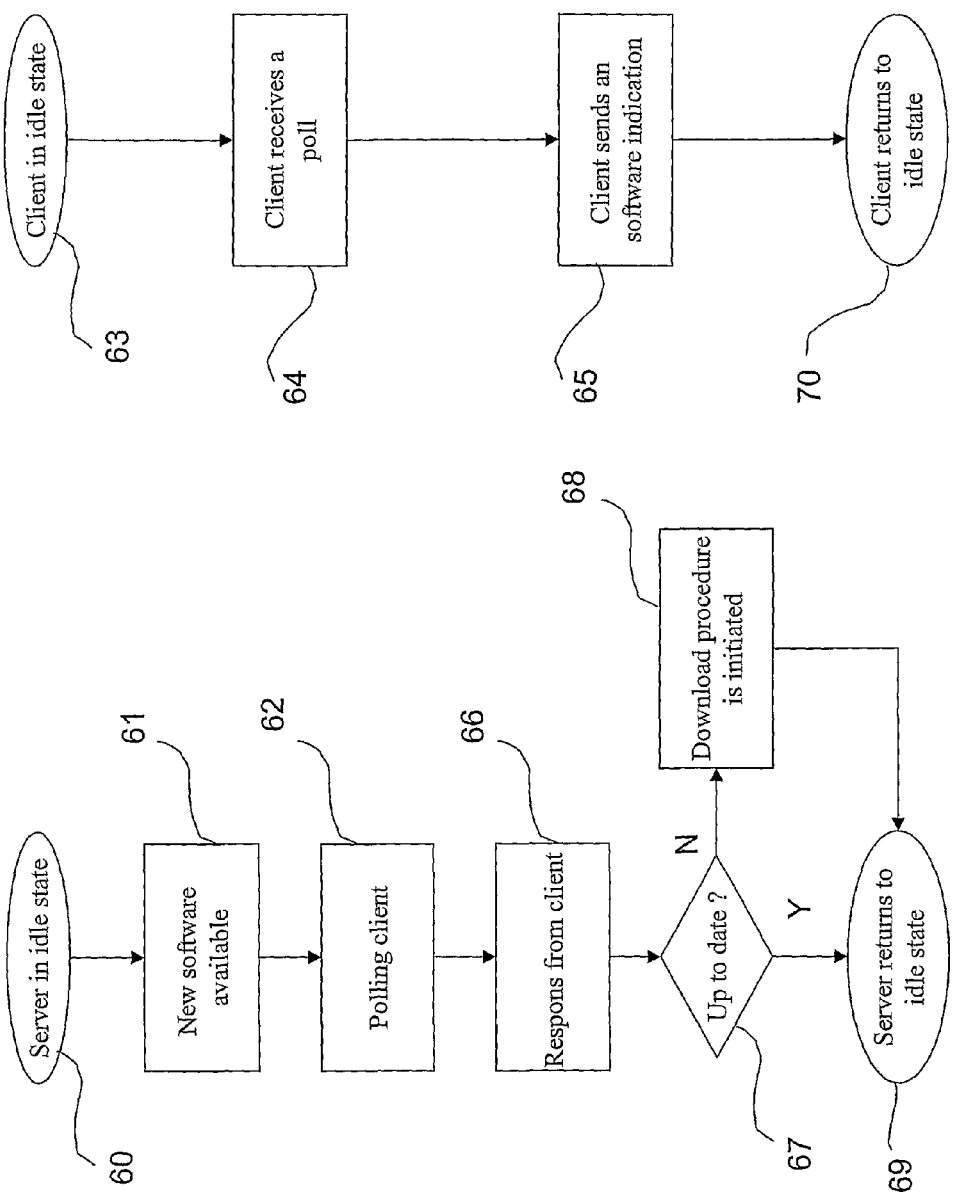

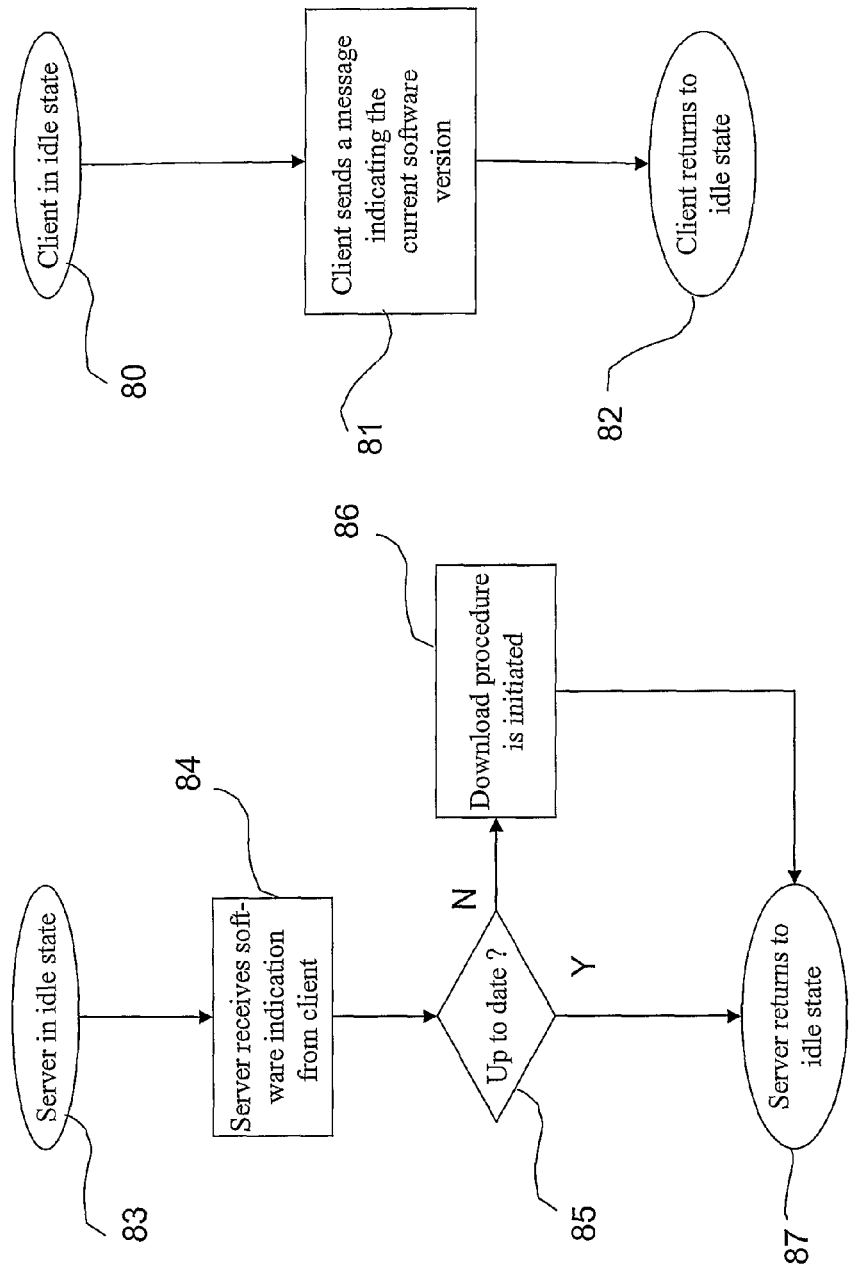

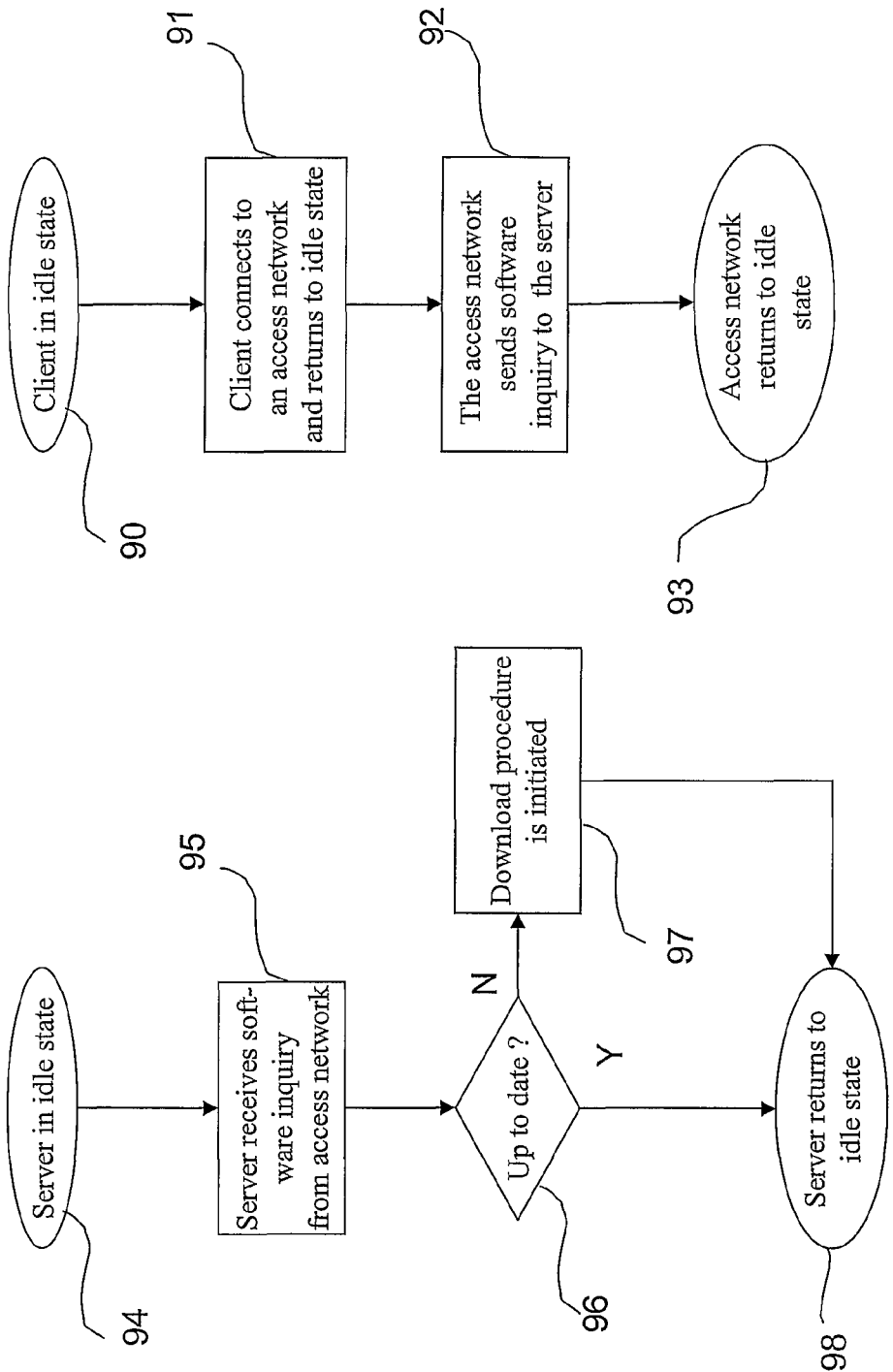

DOWNLOADING AND UPGRADING TERMINAL SOFTWARE OVER THE AIR OF A WIRELESS DEVICE

This application is the US national phase of international application PCT/SE2003/002050 filed 22 Dec. 2003, which designated the U.S., the entire content of which is hereby incorporated by reference.

TECHNICAL OVERVIEW

The field is wireless communications. The techonology is a communication device and a method for downloading and upgrading terminal software of the device over-the-air in a efficient and fail-safe manner. A system in a wireless network includes such a communication device and a computer-readable medium comprising instructions for executing the method.

BACKGROUND

The explosive growth in telecommunication in general, and in the area of wireless communication in particular requires more and more frequent updates of the software applications included in the communication devices, for example, radio interfaces. Another trend also contributing to this development is the ever increasing trend of providing the communication devices with more and more functionality, for example, multiple radio access technologies (RATs), e.g. WCDMA, GSM/GPRS, WLAN, Bluetooth, IEEE 802.11a, or IEEE 802.11b. Given the heterogeneity of functionality wireless networks often have to gradually introduce new functionality into their networks, or modify existing functionality. However, it is then required that the communication devices (e.g. mobile terminals) already present in the network are capable to operate in the new network, i.e. that they are interoperable with the new network, after that the new functionality in the network has been introduced. In addition to the above-mentioned, the users desire access to the latest versions of the software applications in his or hers communication device, e.g. mobile terminals or laptops, even if it is not required from a technical point of view, which is an important factor also influencing this rapid development. However, a problem is when existing communication devices need to update or receive a software application (e.g. wireless e-mail, operating system) and software for operating or configuring a certain RAT (e.g. terminal-network communication protocols, algorithms and data processing functions). Typically, the communication device is taken into a service centre to update or receive an application so that the communication device can provide a service associated therewith. This is time consuming and also expensive.

A number of solutions has been proposed in order to solve this problem. In U.S. Pat. No. 6,052,600 a radio, for example, a cellular phone comprising a dedicated downloading channel for downloading and upgrading terminal software of the radio is disclosed. Thereby, it is not necessary to bring the radio to the communication centre in order to upgrade of receive software included in the radio. For example, software for configuring the cellular phone to operate as a CDMA phone or as a GSM phone.

Nevertheless, the radio and method described in U.S. Pat. No. 6,052,600 is associated with a number of problems and/or limitations. Firstly, a double memory may be needed. In other words, memory space taken up by the current software version cannot be freed until the new version has been properly downloaded since (at least parts of) the old version is in use during the download process. Secondly, resources that may be needed for other communication (normal traffic) is occupied by the software download process. If parts of the old software stored in the memory is over-written (in order to save memory) by the downloaded update, it may be impossible to perform the other communication at all during the download process. Finally, installation of the new software may fail. Errors not discovered before the old software has been removed may result in a non-functioning radio interface, which is impossible to repair through over-the-air upgrade (using erroneous radio functionality).

Thus, there is a need for a communication device and a method for a communication device that are capable of downloading and upgrading terminal software of the device over-the-air, i.e. without bringing it to a service centre, in a efficient and fail-safe manner.

SUMMARY

An object is to provide a communication device and a method that are capable of downloading and upgrading terminal software of the device over-the-air in a efficient and fail-safe manner. This and other objects are achieved by a communication device and method having the features defined in the claims.

The term communication device refers to a software programmable wireless communication terminal. A communication device may receive, transmit, or both using either simplex or duplex communication techniques. A communication device can be, for example, a cellular phone, a computer with a modem, a pager, or personal digital assistant. Furthermore, the term wireless network should be interpreted broadly as a communication principle more than an actual network.

According to a first aspect, there is provided a method for providing a communication device with radio software from a server via a wireless network including a number of access networks, the communication device being arranged to operate in the wireless network and comprising a transceiver for receiving the radio software and storing means comprising at least two radio access technologies for communication with corresponding access networks of the wireless network, comprising the steps of: initiating a download of radio software of a first radio access technology of the communication device; selecting a radio access technology of the communication device for downloading the software; downloading the radio software via the available radio access technology, wherein the radio software designed for the first radio access technology is stored in a memory.

According to a second aspect, there is provided a communication device arranged to operate in a wireless network including a number of access networks, comprising a transceiver for receiving radio software from a software download server via the wireless network; at least two radio access technologies for communication with corresponding radio access networks of the wireless network; a controller for controlling the operation of the transceiver and a memory and arranged to select a radio access technology for downloading of radio software for a first radio access technology of the communication device. The radio software of the first radio access technology is downloaded via the selected radio access technology and stored in the memory.

According to a third aspect there is provided a system in a wireless network including a number of access networks, comprising a software download server connected to the wireless network and at least one communication device according to the second.

According to a further aspect there is provided a computer readable medium comprising instructions for bringing a programmable device to perform the method according to the first aspect.

The technology described in this application is based on the idea of utilizing the in-built functionality of a communication device, i.e. the multiple radio access technology, at the downloading or upgrading of software of one radio access technology of the device. Software intended for one radio access technology downloaded or upgrade is over an available radio access technology supported by the device.

This solution provides several advantages over the existing solutions. One advantage is that the in-built functionality of the communication device is utilized and thereby the communication device does not have to be provided with any dedicated downloading channel for downloading and upgrading the terminal software. Furthermore, the software download can be performed as a background process that does not have to be coordinated with, or blocking, other types of traffic including data, control traffic, or wireless services.

BRIEF DESCRIPTION OF THE DRAWINGS

FIG. 4b is a flow chart of steps of the verification procedure in the communication device according to the embodiment shown in FIG. 4a;

FIG. 5a is a flow chart of steps the triggering procedure in the server according to a first non-limiting, example embodiment;

FIG. 5b is a flow chart of steps the triggering procedure in the communication device according to the first embodiment;

FIGS. 6a-6b is a flow chart of the triggering procedure according to a second non-limiting, example embodiment; and FIGS. 7a-7b is a flow chart of the triggering procedure according to a third non-limiting, example embodiment.

The technology described in this application provides a method and a communication device adapted for operation in a wireless network. The network primarily includes at least one communication device, at least one base station, and a server. For the sake of simplicity, the at least one base station will not be discussed in the forthcoming description since its functioning and interaction with other parts of the network is well known for the man skilled in the art. It should however be noted that the wireless network, in turn, can comprise a number of wireless sub-networks, for example, access networks such as WLAN.

Figure 1:
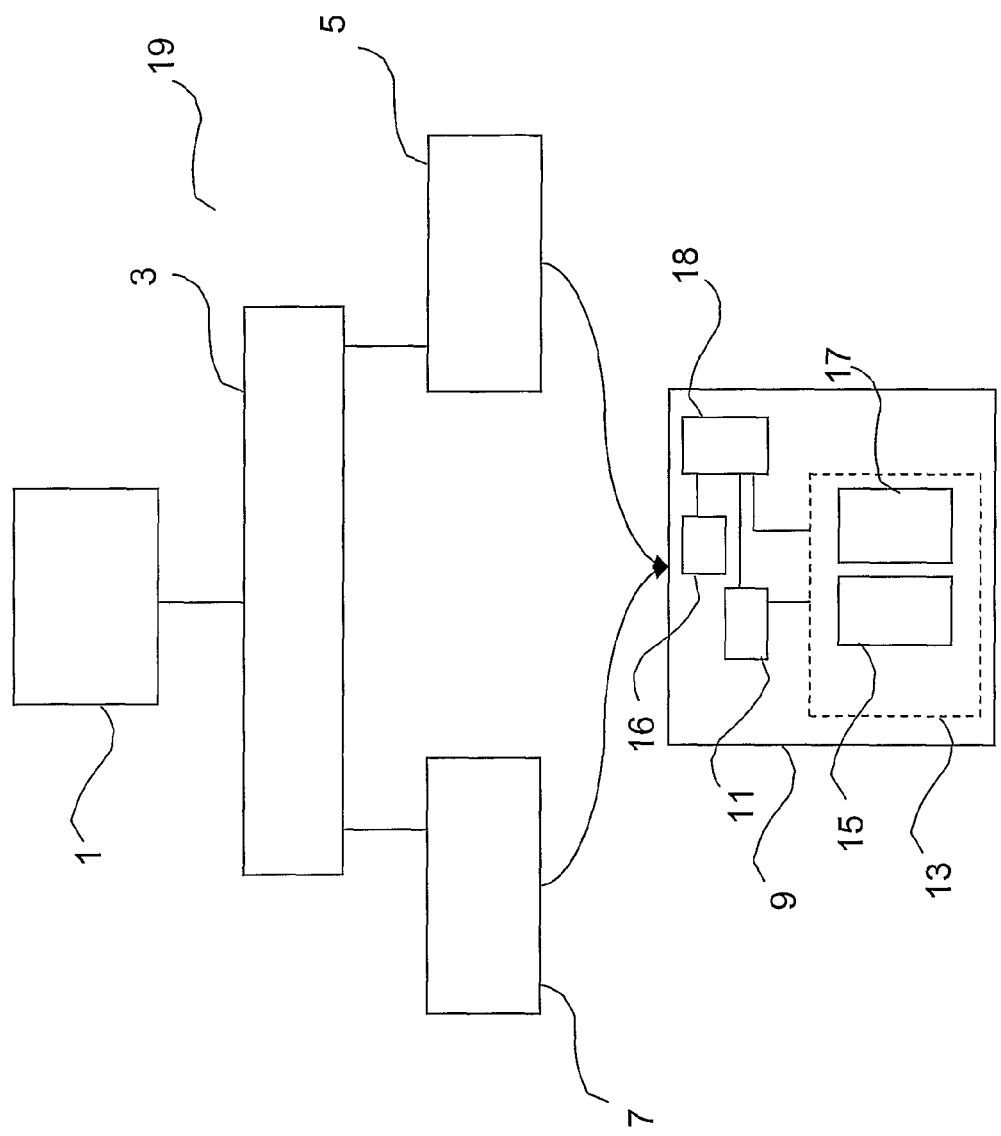
FIG. 1 schematically shows a principle of the technology described in this application.

With reference first to FIG. 1, a principle of the technology described in this application will be described. FIG. 1 shows a simplified block diagram of a wireless network. According to one embodiment, the wireless network 19 includes a software download server 1, for example, located at a service centre is connected to a backbone network 3, which, in turn, is connected to different wireless access networks 5 and 7. Such access networks can, for example, be access networks for WCDMA, GSM/GPRS, WLAN, or Bluetooth. A communication device 9 comprising a transceiver 11 for receiving, for example, software transferred from the server 1, a memory 13, initiating means 16 arranged to initiate or trigger a software download, and a controller 18 for controlling, for example, the download process of the software in the communication device 9. The controller 18 is, inter alia, arranged to select a radio access technology for downloading of the radio software. According to a preferred embodiment of the present invention, a first radio access technology 15, for example, WLAN, and a second radio access technology 17, for example, WCDMA are implemented in the memory and in software configured hardware 13. Of course, there are other conceivable embodiments, for example, three radio access technologies can be implemented in the memory 13. The controller 18 is connected to the transceiver 11, the memory 13, and means for initiating a downloading process 16.

A download of software, for example, configuration information of a RAT of the communication device 9 can be initiated or triggered by a request from the communication device 9, the server 1, or an access network 5 or 7, which starts the download process as will be described further below with reference to FIGS. 5-7. In the example shown in FIG. 1, software for the first RAT 15 is the subject for the download. Thereafter, when it is verified that the software version of the first RAT 15 is not up to date with the corresponding software included in the software download server 1, a RAT of the communication device available for downloading is identified. This verification procedure will also be described with reference to FIGS. 5-7 and as it will be explained it may differ depending on how the download procedure was triggered. In order to find an available RAT, a checking or selecting process is performed, which will be described below with reference to FIGS. 2 and 3. It should be noted however that the second RAT is not implemented with a sole purpose of serving a download interface, but as a communication interface. Accordingly, the first RAT 15 could be a technology that includes software designed for WLAN that may be used for communication in local hotspots area, while the second RAT 17 can be a technology that includes software designed for WCDMA with continuous coverage. In this case, the second RAT 17 is found to be available for download in the above-mentioned procedure. Subsequently, the software is downloaded wirelessly via the access network 5 for the second RAT 17. During the downloading of the software, the software is stored in the memory 13, which will be described in more detail with reference to FIGS. 2 and 3.

Figure 2:
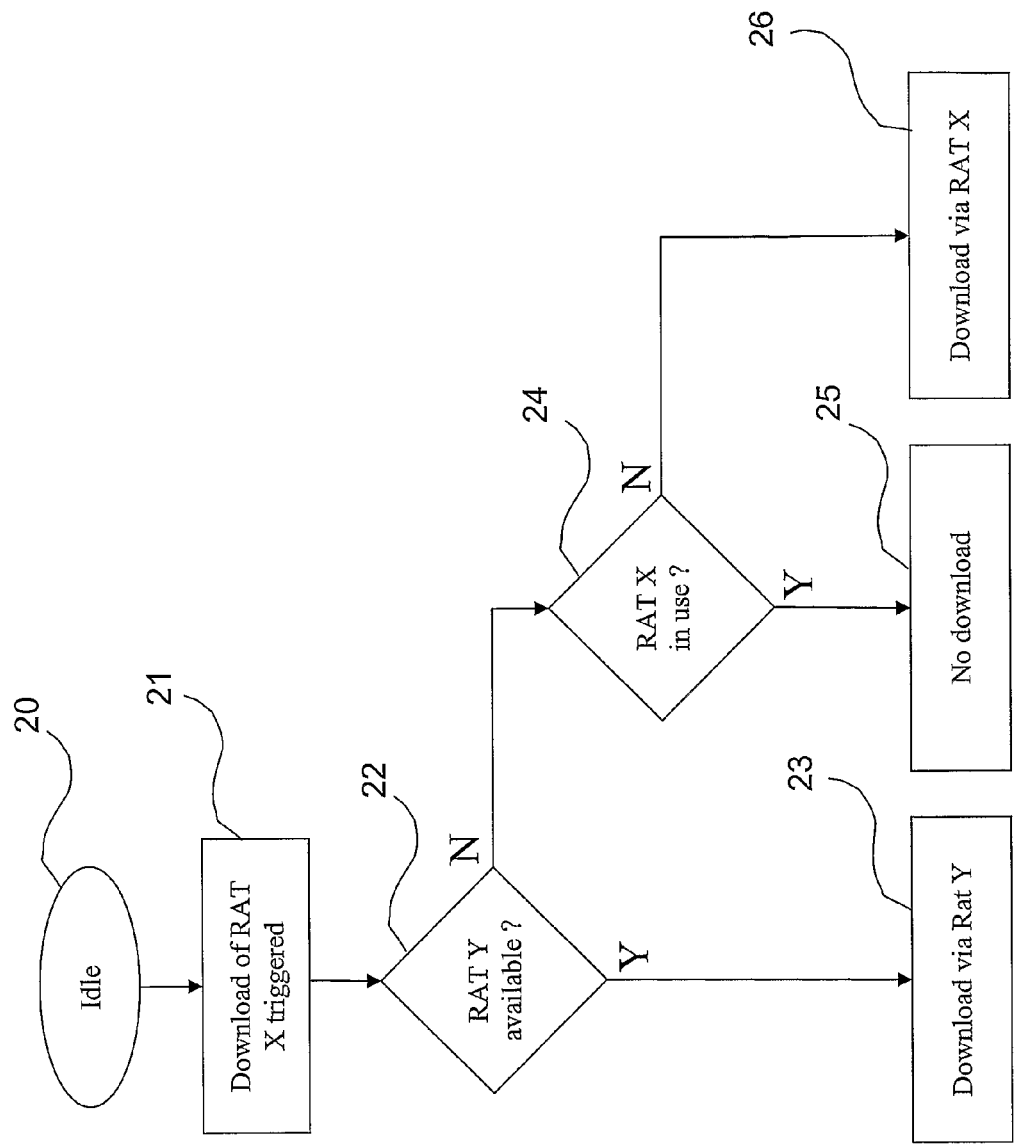
FIG. 2 is a flow chart of the downloading procedure according to a first non-limiting, example embodiment.

Turning now to FIG. 2, the downloading procedure according to a first embodiment will be described. Initially, at step 20, the means for initiating 16 a downloading process of the communication device 9 is in an idle state. However, other means of the device may be in operation, for example, the first RAT 15 can be in a communication state via the access network for the first RAT 15. At step 21, a download of software of a new version of software from the server 1 for the first RAT 15 is triggered. A downloading process may be triggered in a number of different ways, which will be described with reference to FIGS. 5-7, for example by means of the initiating means 16. Thereafter, at step 22, a check whether the second RAT 17 of the communication device 9 is available for download is performed, i.e. whether the RAT 17 is occupied by; for example, a communication process. If the communication device 9 comprises three or more RATs, all of these are of course included in the above-mentioned checking process. If the second RAT 17 is identified as available, the download 18 is, at step 23, performed via the backbone network 3, the access network 5 of the second RAT, and the second RAT 17 and during the download the software is stored in a memory space allocated for the first RAT 15. Preferably, the old version of the first RAT 1 currently stored in the memory 13 is over-written during the downloading process. Thereby, memory space can be saved. On the other hand, if the second RAT 17 is found to be occupied by another process thereby making a download of software via RAT 17 very slow or even impossible, a check whether the first RAT 15 is in use is performed at step 24. If the first RAT 15 is identified to be in use, the downloading process is, at step 25, inhibited.

If, on the other hand, the first RAT 15 is not in use, the download is executed, at step 26, via the backbone network 3, the access network of the first RAT 7, and the first RAT 15 and the software is stored in a memory space allocated for the first RAT 15. Preferably, the old version of the first RAT 15 currently stored in the memory 13 is over-written with the new version during the downloading process. Thereby, memory space can be saved.

Preferably, when the download is completed, a test to verify that the software of the first RAT 15 has been properly installed, or to identify whether the downloaded software is erroneous is performed. If it is found that the new version of the RAT, in this example the first RAT 15, does not operate correctly, an error handling process is initiated. The error handling process may be, for example, to repeat the downloading process in order to achieve a successful downloading of the software. This test process will be described in more detail with reference to FIG. 4.

Figure 3:
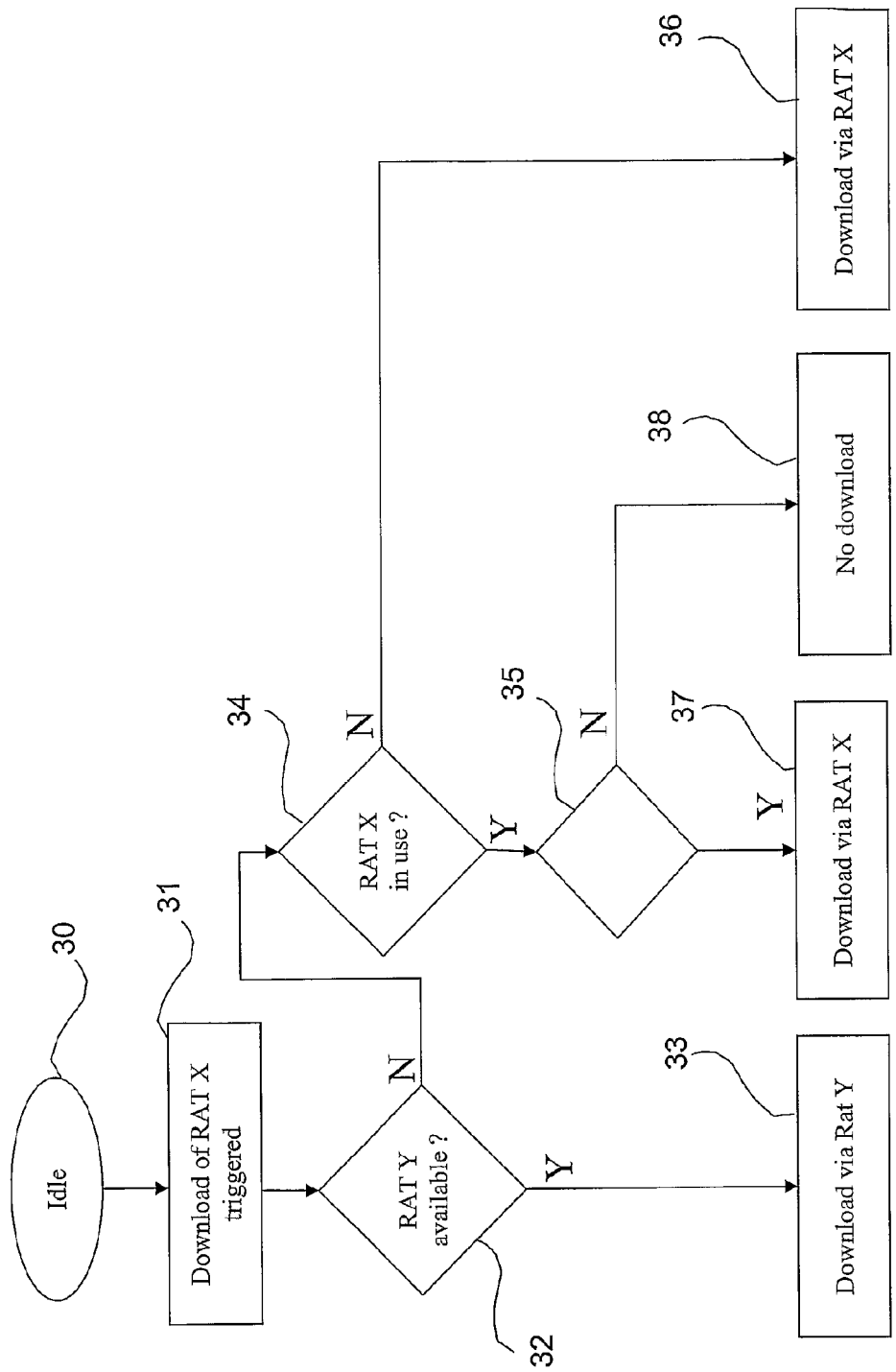
FIG. 3 is a flow chart of the downloading procedure according to a second non-limiting, example embodiment.

With reference now to FIG. 3, the downloading procedure according to a second embodiment will be described. Initially, at step 30, the means for initiating a downloading process of the communication device 9 is in an idle state. However, other means of the device may be in operation, for example, the first RAT 15 can be in a communication state via the access network for the first RAT 7. At step 31 a download of software from the server 1 for the first RAT 15 is triggered. A downloading process may be triggered in a number of different ways, which will be described with reference to FIGS. 5-7. Thereafter, at step 32, a check whether the second RAT 17 of the communication device 9 is available for download is performed, i.e. whether the RAT 17 is occupied by, for example, a communication process. If the communication device comprises three or more RATs, all of these are of course included in the above-mentioned checking process. If the second RAT 17 is identified as available, the download 18 is, at step 33, performed via the backbone network 3, the access network of the second RAT 5, and the second RAT 17 and during the download the software is stored in a memory space allocated for the first RAT 15. Preferably, the old version of the first RAT 15 currently stored in the memory 13 is over-written during the downloading process. Thereby, memory space can be saved.

If, on the other hand, the second RAT 17 is found to be occupied by another process thereby making a download of software via RAT 17 very slow or even impossible, a check whether the first RAT 15 is in use is performed at step 34. If the first RAT 15 is identified to be in use, a check whether there is enough free memory in the memory space allocated for the first RAT 15 to allow a download via the first RAT 15 without interfering and/or interrupting the other processes of the communication device 9 is performed at step 35. If this check yields that there is enough memory in the allocated memory space available, the downloading is, at step 37, executed via the backbone network 3, the access network of the first RAT 7, and the first RAT 15 and during the download the software is stored in the free memory space allocated for the first RAT 15 identified in step 35. In this case, the old version can not be over-written by the new version since the RAT 15 is in use.

If, on the other hand, it is found during this check that there is not enough free memory in the memory allocated for the first RAT 15, the downloading is, at step 38, inhibited. If the first RAT however is not in use, the download is, at step 36, executed via the backbone network 3, the access network of the first RAT 7, and the first RAT 15 and during the download the software is stored in the memory space allocated for the first RAT 15. Preferably, the old version of the first RAT 15 currently stored in the memory 13 is over-written with the new version during the downloading process. Thus, memory space can be saved.

Figure 4A:
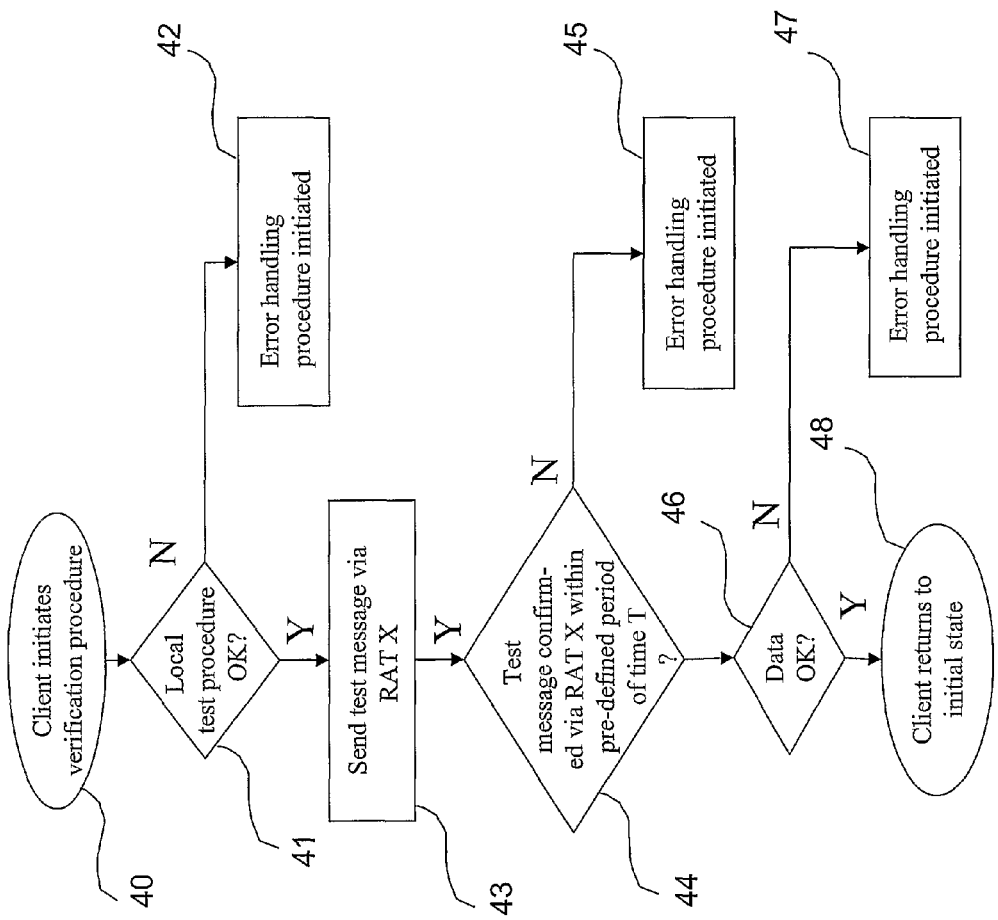
FIG. 4a is a flow chart of steps of the verification procedure in the communication device according to one non-limiting, example embodiment.
Figure 4B:
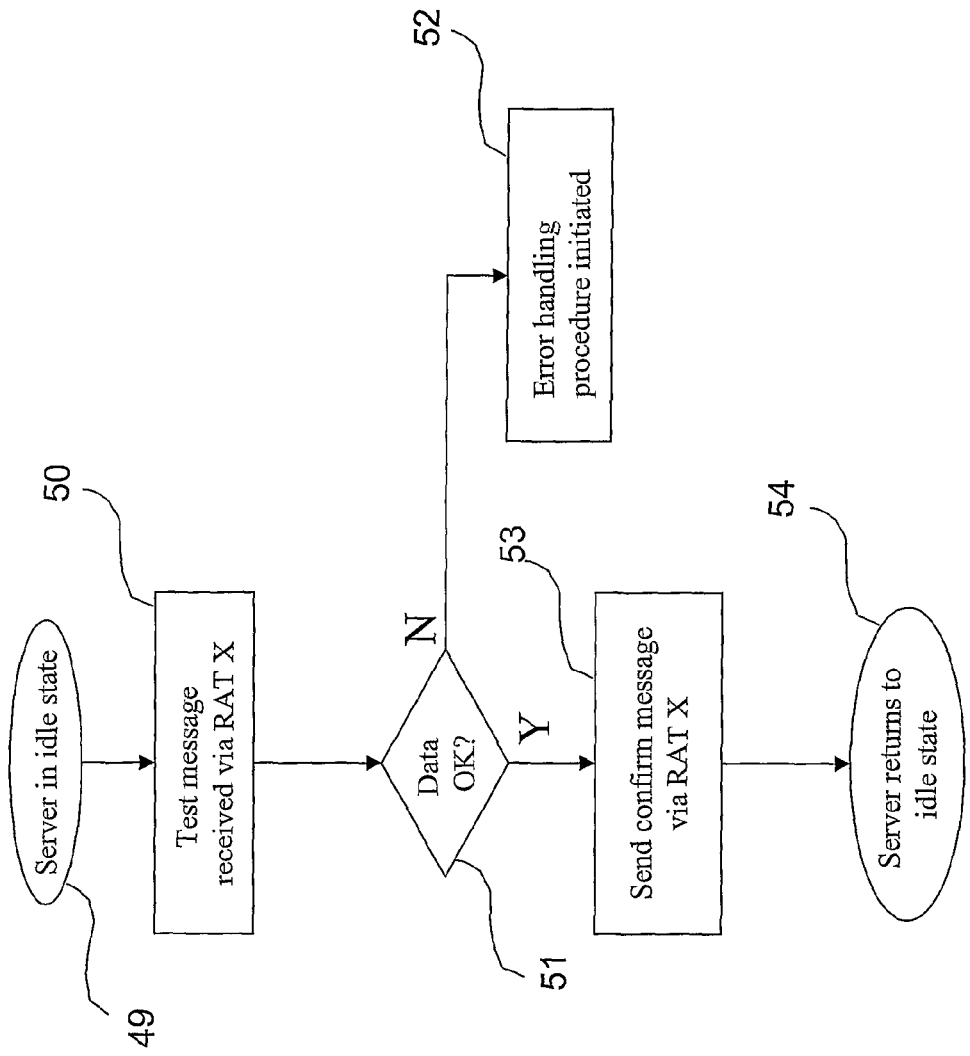

Turning now to FIGS. 4a and 4b, a description will be given of the verification process or test process according to one embodiment of the present invention for determining whether the downloading of software was successful, i.e. whether the downloaded software is functioning in a proper way. At step 40, the client, which in this case is the communication device 9, initiates the verification procedure at completion of the software download. The client may, for example, be in an idle state at the beginning of this step. Thereafter, at step 42, a local test procedure is performed. According to one embodiment, this step comprises the following tests performed in a sequence:

Cyclic redundancy test (CRC) of the downloaded data or software.

A built-in self-test (BIST) of the software configured hardware logic of the device.

A loop-test of the software (e.g. protocol messages).

As the skilled man realizes, there are a number of different local tests that can be performed instead of the above described.

At step 42, an error handling procedure is performed if any one of these tests fail. In accordance with embodiments, this error handling procedure comprises the downloading procedure described with reference to FIG. 2 or 3.

Subsequently, at step 43, if the local test succeeded, a test message is sent via the first RAT 15, the access network 7, and the backbone network 3 to the software download server 1. At step 49, the server is in an idle state, and, at step 50, the server receives the test message. Then, at step 51, a check is performed whether the test message is correctly received. If no, at step 52, the server initiates an error handling procedure as described above. On the other hand, if yes, at step 53, the server 1 sends a confirmation message as a reply of the test message to the communication device 9 via the backbone network 3, the access network 7, and the first RAT 15. Thereafter, at step 54, the server returns to the initial state, which in this case is an idle state. Then, at step 44, a check whether the confirmation message has been received by the communication device 9 within a predetermined period of time T. This predetermined period of time may extend from a few seconds to several hours depending of, for example, the hardware of the communication system. If the confirmation message is not received correctly by the communication device 9 within the predetermined period of time T, an error handling procedure as discussed above is initiated at step 45. This period of time is counted from the transmission of the test message until recipient of the confirmation message. On the other hand, if the confirmation message is received correctly by the communication device 9 within the predetermined period of time T, the software download is considered successful. Then, at step 46, a check whether the content of the confirmation message is correct is performed. If yes, the client returns, at step 48, to the initial state, which may be an idle state, and if no, an error handling procedure as discussed above is initiated at step 47. When, at step 48, the downloaded software is found to be functioning properly, the old software or the parts of the old software not yet over-written can finally be over-written.

With reference now to FIGS. 5a and 5b, the initiating or triggering procedure according to a first embodiment will be described. In this embodiment the downloading is initiated by the server. First, at step 60, the server is in an idle state. Then, at step 61, the server receives a new version of software for the first RAT 15, which can be a WLAN that may be used for communication in local hotspots area. As an example, the operator of the network at which the communication device 9 is connected to implements the new or updated version of the software for the first RAT 15 in the server 1. Thereafter, at step 62, the server 1 sends a polling message to the client, i.e. the communication device 9, which may be in an idle state, see step 63. The message is sent over the access network and RAT with which the communication device is currently associated. Upon receipt of the polling message, at step 64, the client, at step 65, responds with an indication message including information of the current software version of the first RAT. Thereafter, at step 70, the communication device 9 returns to idle state. Then, at step 66, the server 1 receives the indication message from the communication device 9. Subsequently, at step 67, a check is performed whether the software of the first RAT is up to date with the latest or newest version of corresponding software of the server. However, there may be several versions of the software available in the server 1, each comprising different features and in this case a selection can be done in order to choose one of the versions. If no, at step 68, a download procedure according to the description above is started or initiated. Then, at step 69, the server returns to the idle state. On the other hand, if the software version of the first RAT is found to be up to date the server returns to the idle state at step 69.

Referring now to FIGS. 6a and 6b, the initiating or triggering procedure according to a second embodiment will be described. Initially, at step 80, the client, i.e. in this case the communication device 9, is in an idle state. Then, at step 81, the triggering procedure is initiated by the user, which may be due to a need or desire for a new or updated version of the software of a specific RAT of the communication device 9, or by an internal instruction of the device itself by requesting the communication device 9 to update the software of a specific RAT included in the communication device 9 utilizing the initiating means 16 of the communication means 9. Subsequently, at step 82, the communication device 9 sends a software inquiry message indicating the current software version of the specified RAT to the server 1 via an arbitrary RAT of the communication device 9 and backbone network 3. After that, at step 83, the communication returns to an idle state. Initially, at step 84, the server 1 is in an idle state, and at receipt of the software inquiry message, at step 85, the server 1 is set in active state. Then, at step 86, a check is performed whether the software of the specific RAT is up to date with the latest or newest version of corresponding software of the server. However, there may be several versions of the software available in the server 1, each comprising different features and in this case a selection can be done in order to choose one of the versions. If no, at step 87, a download procedure according to the description above is initiated. Then, at step 88, the server returns to the idle state. On the other hand, at step 88, if the software version of the first RAT is found to be up to date the server returns directly to the idle state.

With reference now to FIGS. 7a and 7b, the initiating or triggering procedure according to a third embodiment will be described. In this embodiment, the client, i.e. in this case the communication device 9, will be in an idle state during the triggering procedure. The procedure is initiated by a software check of a RAT of the communication device 9, which check in this case is a part of the normal association procedure between the client and the access network of the RAT. For example, if the communication device connects to a WLAN the software of the corresponding RAT of the communication device 9 is checked. Initially, at step 90, a specific access network is in an idle state. Then, at step 91, as part of the association procedure the access network performs a check of the software of the corresponding RAT of the communication device, i.e. retrieve information regarding the current software version. Thereafter, at step 92, the access network sends a software inquiry message to the server 1 via the backbone network 3, and, at step 94, returns to the idle state. Initially, at step 94, the server 1 is in an idle state, and at receipt of the software inquiry message, at step 95, the server 1 is set in active state. Then, at step 96, a check is performed whether the software of the specific RAT is up to date with the latest or newest version of corresponding software of the server. However, there may be several versions of the software available in the server 1, each comprising different features and in this case a selection can be done in order to choose one of the versions. If no, at step 97, a download procedure according to the description above is initiated. Then, at step 98, the server returns to the idle state. On the other hand, at step 98, if the software version of the first RAT is found to be up to date the server returns directly to the idle state.

Although specific embodiments have been shown and described herein for purposes of illustration and example, it is understood by those of ordinary skill in the art that the specific embodiments shown and described may be substituted for a wide variety of alternative and/or equivalent implementations without departing from the scope of the claims. Those of ordinary skill in the art will readily appreciate that the technology described in this application could be implemented in a wide variety of embodiments, including hardware and software implementations, or combinations thereof. As an example, many of the functions described above may be obtained and carried out by suitable software comprised in a micro-chip. This application is intended to cover any adaptations or variations of the preferred embodiments discussed herein. Consequently, the present invention is defined by the wording of the appended claims and equivalents thereof and the invention is not to be regarded as limited to the structural or functional element described in the embodiments, but to the attached claims.

The invention claimed is:

1. A method for providing a communication device with radio software from a software download server via a wireless network wirelessly over the air including a number of access networks, said communication device being arranged to operate in said wireless network and comprising a transceiver for receiving said radio software and at least first and second radio access technologies for communication with corresponding access networks of said wireless network, comprising the steps of:
   initiating a download of radio software designed for the first radio access technology of said communication device;
   selecting an available one of the first and second radio access technologies of said communication device for downloading said radio software;
   downloading said radio software via the available radio access technology wirelessly over the air; and
   storing the downloaded radio software designed for the first radio access technology in a memory.

2. The method according to claim 1, wherein the step of selecting comprises the step of:
   selecting the second radio access technology for downloading of said radio software.

3. The method according to claim 2, wherein the step of selecting a radio access technology comprises the step of:
   if said second radio access technology is not available for downloading, selecting said first radio access technology for said downloading.

4. The method according to claim 3, wherein said memory comprises temporary storage, wherein the step of selecting comprises the step of:
   if said first radio access technology is in use, downloading via said first radio access technology if said temporary storage is available for receiving said radio software.

5. The method according to claim 1, wherein the radio software designed for the first radio access technology is stored in a memory space allocated for said first radio access technology.

6. The method according to claim 1, further comprising the step of, at completion of the downloading of the radio software of the first radio access technology, verifying that the downloaded software is operational.

7. The method according to claim 6, wherein the step of verifying comprises the step of:
   performing a local test procedure in said communication device.

8. The method according to claim 7, wherein the step of performing a test procedure comprises the steps of:
   performing a cyclic redundancy check of the downloaded software;
   performing a built-in self-test of software-configured hardware logic of the communication device; and
   performing a loop-test of the downloaded software.

9. The method according to claim 6, wherein the step of verifying comprises the step of:
   performing a confirming procedure.

10. The method according to claim 9, wherein the step of verifying comprises the step of:
    performing an error handling procedure.

11. The method according to claim 9, wherein the step of performing a confirming procedure comprises the steps of:
    sending a test message via said first radio technology to said server;
    if a confirmation message has been received via said first radio technology within a predetermined period of time, determining that the downloading of software was successful; and
    if a confirmation message not has been received via said first radio technology within a predetermined period of time, performing an error handling procedure.

12. The method according to claim 1, wherein the step of initiating a download of radio software comprises the steps of:
    polling said communication device about the current version of software of a radio access technology of said communication device;
    checking whether said version of software is up to date with the current version of corresponding software available on said software download server; and
    if said version of software is not up to date, starting a download procedure.

13. The method according to claim 1, wherein the step of initiating a download of radio software comprises the steps of:
    sending an indication message comprising information regarding the current version of software of a radio access technology of said communication device from said communication device to said server via said wireless network;
    checking whether said version of software is up to date with the current version of corresponding software available on said server; and
    if said current version of software is not up to date, starting a download procedure.

14. The method according to claim 1, wherein the step of initiating a download of radio software comprises the steps of:
    at connection of said communication device to an access network, sending an inquiry message from said access network to said server via said network in order to check whether a new version of the software of the radio access technology of said communication device corresponding to said access network is available;
    checking whether said version of software is up to date with the current version of corresponding software available on said server; and
    if said current version of software is not up to date, starting a download procedure.

15. A communication device arranged to operate in a wireless network including a number of access networks, comprising a transceiver for receiving radio software from a software download server wirelessly over the air via said wireless network; and at least first and second radio access technologies for communication with corresponding radio access networks of said wireless network, comprising:
    a controller arranged to select an available one of the first and second radio access technologies for downloading of radio software for a first radio access technology of said communication device; and
    a memory arranged to store said radio software of the first radio access technology downloaded wirelessly over the air via the selected radio access technology.

16. The device according to claim 15, wherein said controller is arranged to select a second radio access technology for downloading of said radio software.

17. The device according to claim 16, wherein said controller is arranged to, if said second radio access technology is not available for downloading, select said first radio access technology for said downloading.

18. The device according to claim 17, wherein said memory comprises temporary storage and wherein said controller is arranged to, if said first radio access technology is in use, select said first radio access technology for downloading if said temporary storage is available for receiving said radio software.

19. The device according to claim 15, wherein the radio software designed for the first radio access technology is stored in a memory space allocated for said first radio access technology.

20. The device according to claim 15, wherein said controller is arranged to, at completion of the downloading of the radio software of the first radio access technology, verify that the downloaded software is operational.

21. The device according to claim 20, wherein said controller is arranged to perform a local test procedure.

22. The device according to claim 21, wherein said controller is arranged to perform a cyclic redundancy check of the downloaded software, a built-in self-test of hardware logic of the communication device, and a loop-test of the downloaded software.

23. The device according to claim 20, wherein said controlling means is arranged to perform a confirming procedure.

24. The device according to claim 20, wherein said controller is arranged to perform an error handling procedure.

25. The device according to claim 23, wherein said controller is arranged to:
- send a test message via said first radio technology to said server;
  - if a confirmation message has been received via said first radio technology within a predetermined period of time, determine that the downloading of software was successful; and
  - if a confirmation message not has been received via said first radio technology within a predetermined period of time, perform an error handling procedure.

26. The device according to claim 1, further comprising initiating means for initiating a download of radio software of a radio access technology of said communication device and wherein said controller is arranged to control the operation of said initiating means.

27. The system in a wireless network including a number of access networks, comprising a software download server connected to said wireless network and at least one communication device according to claim 15.

28. A non-transitory, computer-readable medium comprising instructions for bringing a programmable device to perform the method according to claim 1.

* * * * *

UNITED STATES PATENT AND TRADEMARK OFFICE
CERTIFICATE OF CORRECTION

PATENT NO.         : 8,171,468 B2
APPLICATION NO.    : 10/583956
DATED              : May 1, 2012
INVENTOR(S)        : Larsson et al.

It is certified that error appears in the above-identified patent and that said Letters Patent is hereby corrected as shown below:

On the Title Page, item (75), under "Inventors", in Column 1, Line 3,
delete "Lundsjo, Spánga" and insert -- Lundsjö, Spånga --, therefor.

On the Title Page, item (56), under "OTHER PUBLICATIONS", in Column 2, after "2004."
insert -- V. Bale et al., A TRANSPARENT DYNAMIC OPTIMIZATION SYSTEM, Proc. of the
ACM SIGPLAN 2000 Conf. on Prog. Language Design and Impl. pgs. 1-2, Jun. 2006.

E. Duesterwald et al., SOFTWARE PROFILING FOR HOT PATH PREDICTION: LESS IS MORE,
ACM SIGPLAN Notices, 35(11), pgs. 202-211, 2000.

D. Bruening, et al., AN INFRASTRUCTURE FOR ADAPTIVE DYNAMIC OPTIMIZATION, Proc.
of the 1st Intl. Symp. on Code Generation and Optimization, pgs. 265-275, Mar. 2003.

W.K. Chen et al., A DYNAMIC OPTIMIZATION SYSTEM. Proc. of the 3rd ACM Workshop
on Feedback-Directed and Dynamic Optimization (FDDO-3), Dec 2000.

J.C. Dehnert et al., THE TRANSMETA CODE MORPHING SOFTWARE; USING SPECULATION,
RECOVERY, AND ADAPTIVE RETRANSLATION TO ADDRESS REAL-LIFE CHALLENGES,
Proc. of the 1st Intl. Symp. on Code Generation and Optimization, pgs.
15-24, Mar. 2003. -- at Line 3, as new entries.

In Fig. 5a, Sheet 6 of 8, for Tag "66", in Line 1, delete "Respons" and insert -- Response --, therefor.

In Column 1, Line 12, delete "techonology" and insert -- technology --, therefor.

In Column 2, Line 67, delete "second." and insert -- second aspect. --, therefor.

In Column 3, Line 36, delete "of steps the" and insert -- of the --, therefor.

Signed and Sealed this
Sixth Day of November, 2012

David J. Kappos
*Director of the United States Patent and Trademark Office*

CERTIFICATE OF CORRECTION (continued)
U.S. Pat. No. 8,171,468 B2

In Column 3, Line 39, delete "of steps the" and insert -- of the --, therefor.

In Column 3, at Line 46, insert the heading
-- DESCRIPTION OF NON-LIMITING, EXAMPLE EMBODIMENTS --.

In Column 4, Line 67, delete "RAT 1" and insert -- RAT 15 --, therefor.

In Column 6, Line 25, delete "test (CRC)" and insert -- check (CRC) --, therefor.